(12) United States Patent
Hyatt

(10) Patent No.: US 7,643,745 B2
(45) Date of Patent: Jan. 5, 2010

(54) ELECTRONIC DEVICE WITH AUXILIARY CAMERA FUNCTION

(75) Inventor: Edward Craig Hyatt, Durham, NC (US)

(73) Assignee: Sony Ericsson Mobile Communications AB, Lund (SE)

(\*) Notice: Subject to any disclaimer, the term of this patent is extended or adjusted under 35 U.S.C. 154(b) by 492 days.

(21) Appl. No.: 11/464,511

(22) Filed: Aug. 15, 2006

(65) Prior Publication Data

US 2008/0044171 A1 Feb. 21, 2008

(51) Int. Cl.
*G03B 13/18* (2006.01)
*G03B 3/00* (2006.01)

(52) U.S. Cl. .......................... 396/137; 396/89
(58) Field of Classification Search ............ 396/76, 396/89, 103, 104, 429, 137; 348/345, 373, 348/375, 376; 455/556.1
See application file for complete search history.

(56) References Cited

U.S. PATENT DOCUMENTS

| 5,895,130 | A | 4/1999 | Saito et al. |
| 6,763,187 | B2 * | 7/2004 | Shiraishi ..................... 396/104 |
| 7,071,986 | B2 | 7/2006 | Kobayashi et al. |
| 2002/0036836 | A1 | 3/2002 | Hagimori |
| 2004/0129783 | A1 | 7/2004 | Patel |
| 2004/0189856 | A1* | 9/2004 | Tanaka ........................ 348/345 |
| 2006/0105806 | A1* | 5/2006 | Vance et al. ............. 455/556.1 |
| 2007/0009251 | A1 | 1/2007 | Koskinen |
| 2007/0147817 | A1* | 6/2007 | Li et al. ....................... 396/133 |
| 2007/0298829 | A1* | 12/2007 | Hamamura et al. ...... 455/550.1 |

FOREIGN PATENT DOCUMENTS

| EP | 1 628 473 | 2/2006 |
| JP | 2003-262788 | 9/2003 |

OTHER PUBLICATIONS

International Search Report for corresponding Application No. PCT/US2007/004667 dated Jul. 31, 2007.
International Preliminary Report on Patentability for corresponding Application No. PCT/US2007/004667 dated Sep. 17, 2008.
Sharp Model No. V902, relevant pages available at http:/www.sharp-phone.com/country/products/product/spec.php?country=ZA&lang=en.

\* cited by examiner

*Primary Examiner*—Kenneth J Whittington
(74) *Attorney, Agent, or Firm*—Renner, Otto, Boisselle & Sklar, LLP

(57) ABSTRACT

An electronic device includes circuitry for carrying out an operation unrelated to camera operation, and camera circuitry for carrying out a camera related operation, the camera circuitry including circuitry for providing autofocus control. The electronic device further includes a camera lens operatively coupled to the camera circuitry, a focus state of the camera lens being controlled by the camera circuitry. In addition, the electronic device includes an operator input operatively coupled to at least the camera circuitry for enabling an operator to provide an input unrelated to focus control of the camera lens in a first operating condition, and to provide a manual focus control input to the camera lens in a second operating condition.

14 Claims, 5 Drawing Sheets

ELECTRONIC DEVICE WITH AUXILIARY CAMERA FUNCTION

TECHNICAL FIELD OF THE INVENTION

The present invention relates generally to portable electronic devices such as mobile phones, and more particularly to portable electronic devices having an auxiliary camera function.

DESCRIPTION OF THE RELATED ART

Portable electronic devices such as mobile phones have been popular for years and yet only continue to increase in popularity. Traditionally, mobile phones had been used strictly for conventional voice communications. However, as technology has developed mobile phones are now capable not only of conventional voice communications, but also are capable of data communications, video transfer, media reproduction, commercial radio reception, etc. More and more, a user having a single electronic device such as a mobile phone is able to perform a variety of different functions.

Many mobile phones today include a camera function for taking pictures. The pictures may be stored digitally in memory, transmitted over the carrier network, etc. As technology and manufacturing processes have improved, mobile phones nowadays are capable of capturing images at relatively high resolutions previously found only in dedicated cameras. This has resulted in mobile phones possessing even more sophisticated camera features. These features include, for example, macro operation, autofocus control, red-eye reduction, etc.

Macro operation, as is known, involves taking photographs of an object at very close range. Ideally, the focal point of the camera lens is adjusted for very close range during macro photography. Unfortunately, mobile phones and other electronic devices that include autofocus control sometimes experience difficulty providing appropriate autofocus control especially during macro operation. This results in images that are out of focus, leading to user disappointment, etc.

There are primarily two types of autofocus control, active and passive. In active autofocus control, the mobile phone transmits pulses of infrared (IR) or sonic energy. The object to be photographed reflects these pulses back toward the mobile phone where the pulses are received. The mobile phone determines the time of flight of the infrared or acoustic pulses, and computes the focal length to the object. Based on the computed focal length, the mobile phone adjusts the camera lens within the mobile phone so as to focus on the object. In passive autofocus control, the mobile phone processes the image data received by the camera lens and adjusts the lens to provide maximum sharpness/contrast in the image.

In macro operation where the object may be only inches away, the pulses received by the mobile phone in active autofocus control may be reflected too quickly and/or from too many angles. In addition, or in the alternative, the object itself may be the source of noise that confuses the autofocus control (e.g., when photographing a candle flame that emits IR energy). Autofocus control within the mobile phone is oftentimes unable to process the reflections sufficiently. As a result, the autofocus control reverts to an "infinity focus" or focuses on the wrong point in the image, leaving the desired photograph subject out of focus. In the case of passive autofocus control, the mobile phone or other type electronic device simply may not have sufficient computational capacity to process and focus the image. Such computational capacity is typically reserved for higher-end, dedicated digital cameras. Consequently, the autofocus control of the mobile phone again will revert to "infinity focus" or focus on the wrong point in the image.

As a result, there is a strong need for a mobile phone or other electronic device having an auxiliary camera function that has the ability to focus the camera even under circumstances where autofocus control may otherwise fail. While higher-end, dedicated digital cameras offer manual focus override capability, this is typically by way of the user manually rotating the lens barrel. Electronic devices having an auxiliary camera function typically do not include a lens barrel that the user may manually rotate in order to focus on an object.

Moreover, it is undesirable simply to add additional control buttons or inputs to an electronic device to provide manual focus operation. There is a constant push for miniaturization of the electronic devices such as mobile phones to satisfy the convenience and desires of users. Simply adding additional control buttons or inputs can result in the need for increased surface area on the electronic device, which is undesirable. In addition, or in the alternative, adding additional control buttons or inputs can result in a reduction in the size of the other control buttons or inputs. This is undesirable as smaller buttons become more difficult for a user to operate.

In view of the aforementioned shortcomings, there is a strong need in the art for a mobile phone or other electronic device that provides both autofocus and manual focus control without sacrificing size and/or convenience to the user.

SUMMARY

According to one aspect of the invention, an electronic device is provided that includes circuitry for carrying out an operation unrelated to camera operation, and camera circuitry for carrying out a camera related operation, the camera circuitry including circuitry for providing autofocus control. The electronic device further includes a camera lens operatively coupled to the camera circuitry, a focus state of the camera lens being controlled by the camera circuitry. In addition, the electronic device includes an operator input operatively coupled to at least the camera circuitry for enabling an operator to provide an input unrelated to focus control of the camera lens in a first operating condition, and to provide a manual focus control input to the camera lens in a second operating condition.

According to another aspect of the invention, the operator input in the first operating condition provides zoom control as part of the camera related operations.

In accordance with another aspect of the invention, the camera circuitry comprises circuitry for determining whether the autofocus control is acceptable in accordance with a predefined criteria, and based on the determination automatically controls whether the operator input is operative in the first operating condition or the second operating condition.

According to still another aspect of the invention, the circuitry for providing autofocus control provides active autofocus control.

With still another aspect of the invention, the circuitry for providing autofocus control utilizes time of flight of transmitted and received pulses, and the predefined criteria is based on time of flight information obtained by the circuitry for providing autofocus control.

In yet another aspect of the invention, the pulses are infrared light pulses.

According to another aspect, the circuitry for providing autofocus control provides passive autofocus control.

According to still another aspect of the invention, the predefined criteria is based on an evaluation of edge contrast.

With still another aspect of the invention, the operator input is operative in the first operating condition or the second operating condition is based on an operator mode selection.

In accordance with another aspect of the invention, the operator mode selection is a macro photography mode selection.

According to another aspect of the invention, the operation unrelated to camera operation comprises mobile phone operation.

According to still another aspect of the invention, the operator input is operative in the first operating condition to control a function of the mobile phone operation.

In accordance with yet another aspect of the invention, the function comprises volume within the mobile phone operation.

According to another aspect of the invention, the circuitry for carrying out an operation unrelated to camera operation and the camera circuitry are embodied at least in part within a common microcontroller.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF EMBODIMENTS

Figure 1:
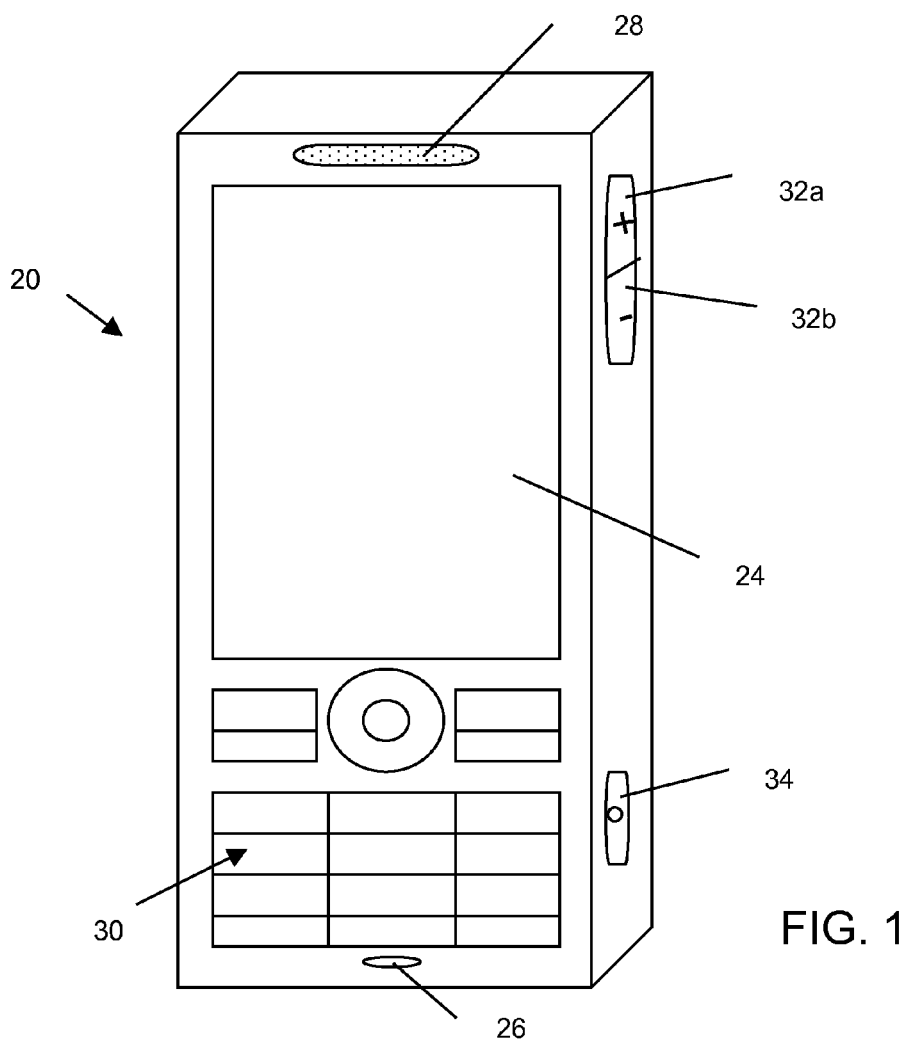
FIG. 1 is a front perspective view of an electronic device in an exemplary embodiment of the present invention.

The present invention will now be described with reference to the figures, wherein like reference numerals are used to refer to like elements throughout.

Figure 2:
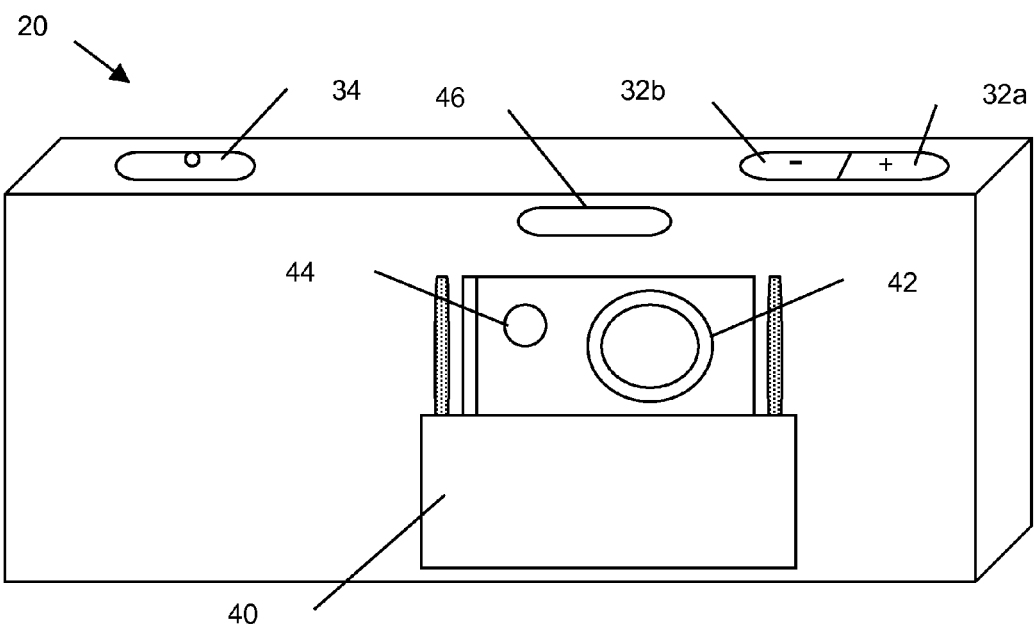
FIG. 2 is a rear perspective view of the electronic device of FIG. 1 in accordance with the exemplary embodiment of the present invention.

Referring initially to FIGS. 1 and 2, an electronic device 20 is shown in accordance with an exemplary embodiment of the present invention. In the exemplary embodiment, the electronic device 20 is a mobile phone for carrying out mobile communications including voice communications, etc. In addition to operating as a mobile phone, the electronic device 20 also may function as a camera for taking photographs. While the present invention is described herein in the context of the electronic device 20 being a mobile phone, it will be appreciated that the electronic device 20 may be any type of electronic device having an auxiliary camera function (e.g., a personal digital assistant (PDA), personal media player, etc.). The particular type of electronic device is not germane to the present invention in its broadest sense.

As is shown in FIG. 1, the exemplary embodiment of the mobile phone 20 includes a liquid crystal display 24 serving as a graphical user interface (GUI). The display 24 provides a display of various types of information as is conventional. For example, the display 24 may display the operational status of the phone 20, contact information, menu information, text, graphics, images, videos, etc. When the mobile phone 20 is utilized as a camera as described herein, the display 24 may function as an electronic viewfinder to aid the user when taking a photograph. In addition, in the case where the display 24 is a touch sensitive display, the display 24 may serve as an input device to allow the user to input data, menu selections, etc.

The mobile phone 20 further includes a microphone 26 and a speaker 28. As is conventional, the microphone 26 and speaker 28 allow a user to carry out conventional voice communications by placing the phone 20 adjacent the user's ear. In addition, the mobile phone 20 includes a keypad 30 having an assortment of keys. The keypad 30 facilitates user input and operation of the mobile phone 20 as is conventional. For example, the keypad 30 may include keys for navigating the menus displayed on the display 24, selecting predefined functions such as camera operation, initiating or terminating a call, etc.

The mobile phone 20 also may include other keys or buttons useful in the operation of the mobile phone 20. For example, the mobile phone 20 includes buttons 32a and 32b mounted on a side face of the mobile phone housing. During use of the mobile phone 20 as a telephone or media player, the buttons 32a and 32b serve as a convenient means to allow a user to adjust the volume up or down, respectively. In addition, the mobile phone 20 includes a button 34 that allows a user to answer or "pick up" an incoming call simply by pressing the button 34.

Furthermore, when the mobile phone 20 operates as a camera as discussed more fully below, the buttons 32a and 32b respectively function to increase and decrease the amount of zoom provided by the camera. The button 34, on the other hand, functions as a shutter button. As is conventional, by depressing the button 34 only part way, autofocus control circuitry within the mobile phone 20 is able to lock in the camera auto focus. By depressing the button 34 completely, the camera shutter function is activated and a photograph taken.

FIG. 2 illustrates a typical orientation of the mobile phone 20 when utilized as a camera. As is shown, the rear of the housing includes a slidable cover 40. When open as shown in FIG. 2, the cover 40 exposes a camera lens 42 and an autofocus transducer 44. When the cover 40 is closed, the camera lens 42 and autofocus transducer 44 are protected from dirt, dust, scratches, etc. The mobile phone 20 also includes a flash element 46 for providing light under low lighting conditions.

As will be described in more detail below in relation to FIG. 3, the autofocus transducer 44 transmits pulses of infrared or ultrasonic energy towards an object to be photographed. The pulses are reflected off the object and travel back towards and are received by the autofocus transducer 44. Those having ordinary skill in the art will appreciate how the time of flight of the pulses is related to the distance of the object from the mobile phone 20. The mobile phone 20 utilizes the time of flight information to automatically focus the camera lens 42 to the appropriate focal length to photograph the object.

In order to utilize the autofocus feature, the user points the lens 42 of the mobile phone 20 at the object and presses the button 34 part way. This causes the autofocus transducer 44 to emit and receive the infrared or sonic pulses, and the mobile phone 20 calculates the appropriate focal length setting and automatically adjusts the focus of the lens 42. The user typically is notified that autofocus has been successfully achieved by way of a display icon or similar visual indicator provided in the display 24 serving as the electronic viewfinder. In addition, or in the alternative, the user may be notified that autofocus has been successfully achieved via an audible indicator such as a beep or the like. The user then takes the picture by pressing the button 34 the remainder of the way down in order to trigger the shutter function.

The user adjusts the zoom setting by operating the buttons 32a and 32b when the mobile phone 20 is functioning as a camera. By pressing the buttons 32a and 32b, the mobile phone 20 in one embodiment provides digital zoom in the sense that the image as displayed in the viewfinder and as captured by the camera is zoomed in or out by digitally manipulating the image data obtained via the camera lens 42. In addition or in the alternative, in an embodiment of the mobile phone 20 where the camera lens 42 is a zoom lens, the mobile phone 20 provides optical zoom in the sense that the user may control the zoom setting of the lens 42 via the buttons 32a and 32b.

The mobile phone 20 as described thus far in relation to FIGS. 1 and 2 operates conventionally and is constructed in substantially the same manner as conventional mobile phones having an auxiliary camera function. However, the mobile phone 20 of the present invention differs substantially from other mobile phones having an auxiliary camera function primarily in the following manner. A user may incur instances where the autofocus control of the mobile phone 20 is unable to achieve acceptable autofocus. As described above, for example, in macro operation where the object being photographed may be only inches away, the pulses received by the autofocus transducer 44 during active autofocus control may be reflected too quickly and/or from too many angles. In addition, or in the alternative, the object itself may be the source of noise that confuses the autofocus control (e.g., photographing a candle flame that emits IR energy). The autofocus control within the mobile phone 20 may be unable to process the reflections sufficiently.

In accordance with the present invention, the mobile phone 20 detects when the autofocus control is unable to focus satisfactorily. Upon detecting such condition, the mobile phone 20 automatically reconfigures the operation of the buttons 32a and 32b so as to provide manual focus control in place of the ordinary zoom control. Thus, by pressing the buttons 32a and 32b the user can adjust the focal length of the camera lens 42 while viewing the object through the viewfinder (e.g., the display 24). The user can focus on the object via the buttons 32a and 32b and upon achieving the desired focus, take the photograph by depressing the button 34 to activate the shutter function.

The mobile phone 20 preferably notifies the user of the inability to autofocus satisfactorily and the need to focus manually. For example, the mobile phone 20 may notify the user visually by displaying an alert via the viewfinder (e.g., the display 24). In addition or the alternative, the mobile phone 20 may notify the user via an audible indicator that preferably is different from any audible indicator used to indicate the auto focus control has been successfully achieved.

As will be appreciated, such operation of the mobile phone 20 allows the user to manually focus the camera lens 42 without necessitating the addition of one or more control buttons or inputs. Simply adding additional control buttons or inputs, as noted above, can result in the need for increased surface area on the mobile phone 20 or the reduction in the size of the other control buttons or inputs, both of which are undesirable. Instead, the mobile phone 20 in accordance with the present invention allows an existing control input that ordinarily is not associated with a manual focus operation (e.g., the zoom/volume control buttons 32a and 32b) to function as a manual focus control input automatically under circumstances in which the autofocus control cannot achieve satisfactory focus. The present invention is described herein in relation to the zoom/volume control buttons 32a and 32b also functioning as manual focus inputs when autofocus is unavailable. However, those having ordinary skill will appreciate that the present invention equally encompasses other control inputs (e.g., buttons or keys) on the mobile phone 20 having an ordinary function unrelated to manual focus yet serving as manual focus inputs similar to the zoom/volume control buttons 32a and 32b in the event the autofocus control cannot obtain satisfactory focus.

Figure 3:
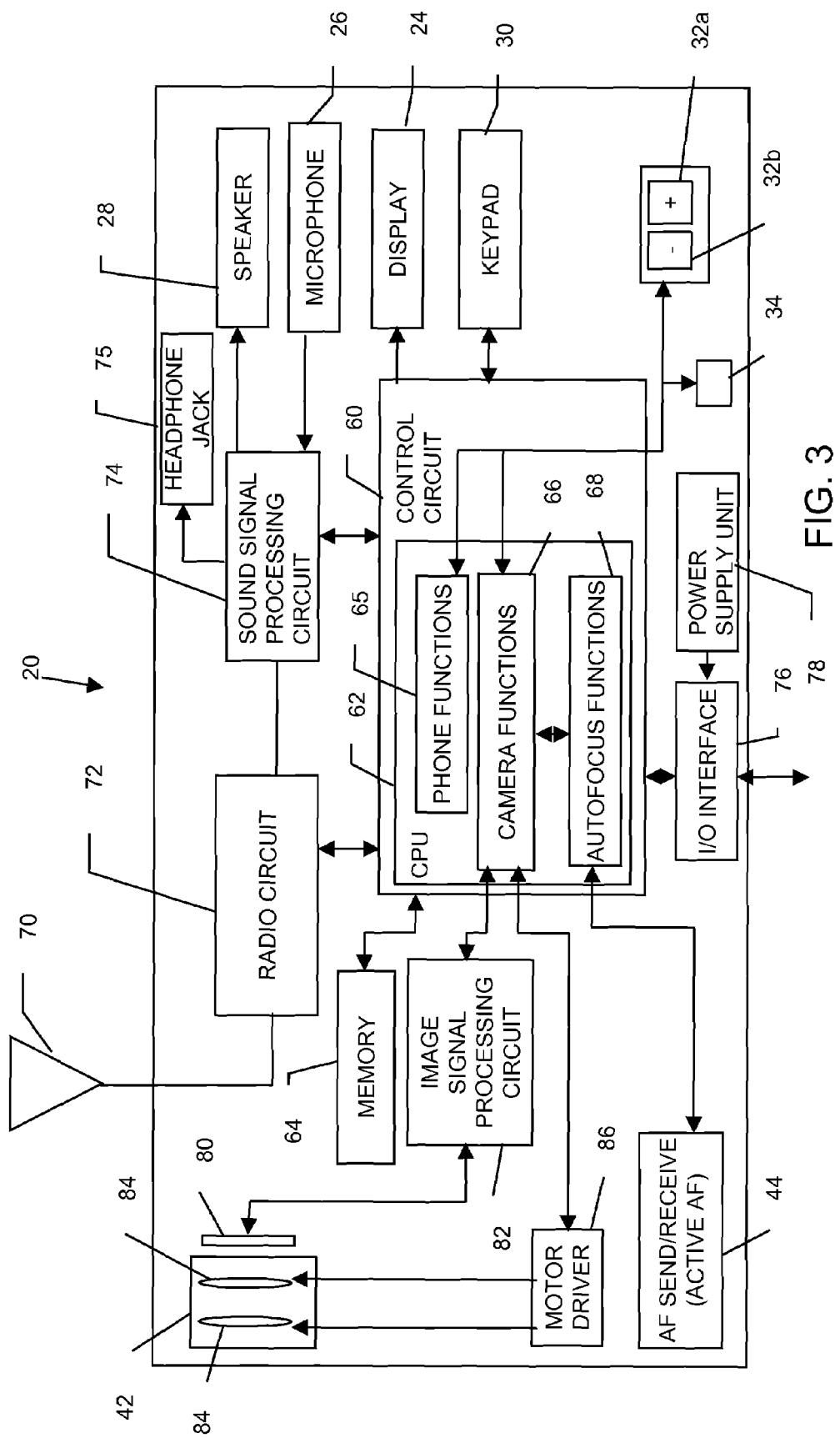
FIG. 3 is a schematic block diagram of the electronic device of FIGS. 1 and 2 in accordance with the exemplary embodiment of the present invention.

FIG. 3 represents a functional block diagram of the mobile phone 20 in accordance with the present invention. The construction of the mobile phone 20 is generally conventional with the exception of the auto/manual focus control capabilities described herein. Preferably, such capabilities are implemented primarily via software within the mobile phone 20. However, it will be apparent to those having ordinary skill in the art that such operation can be carried out via primarily software, hardware, firmware, or combinations thereof, without departing from the scope of the invention.

The mobile phone 20 includes a primary control circuit 60 that is configured to carry out overall control of the functions and operations of the mobile phone 20. The control circuit 60 may include a CPU, microcontroller, or microprocessor, etc., collectively referred to herein simply as a CPU 62. The CPU 62 executes code stored in memory (not shown) within the control circuit 60, and/or in a separate memory 64 in order to carry out conventional operation of the mobile phone functions 65 within the mobile phone 20. In addition, the CPU 62 executes code similarly stored in memory to carry out the camera functions 66 and autofocus functions 68 described herein.

Continuing to refer to FIG. 3, the mobile phone 20 includes an antenna 70 coupled to a radio circuit 72. The radio circuit 72 includes a radio frequency transmitter and receiver for transmitting and receiving signals via the antenna 70 as is conventional. The mobile phone 20 further includes a sound processing circuit 74 that processes the audio signal transmitted by/received from the radio circuit 72. In addition, the sound processing circuit 74 serves to process an audio signal provided by the control circuit 60 during playback of media files, for example. Also coupled to the sound processing circuit 74 are the aforementioned microphone 26 and speaker 28, and a headset jack 75, for example. The radio circuit 72 and sound processing circuit 74 are each coupled to the control circuit 60 that carries out overall operational control.

The mobile phone 20 also includes the aforementioned display 24, keypad 30, buttons 32a and 32b, and button 34 coupled to the control circuit 60. The mobile phone 20 further includes an I/O interface 76. The I/O interface 76 may be in the form of any one of many typical mobile phone I/O interfaces, such as a multi-element connector at the base of the mobile phone 20. As is typical, the I/O interface 76 may be used to couple the mobile phone 20 to a battery charger to charge a power supply unit (e.g., battery) 78 within the mobile phone 20. Further, the I/O interface 76 may serve to connect the mobile phone 20 to a personal computer or other device via a data cable, etc., in order to download photographs or perform various other operations. As another alternative, the I/O interface 76 may serve to connect the mobile phone 20 to a docking station including an audio amplifier, speakers and/or video display to allow for enhanced viewing/listening of the media objects as part of a media player function.

As previously described, the mobile phone 20 includes the camera lens 42. The camera lens 42 serves to image an object(s) to be photographed onto an image capture device such as a charge-coupled device (CCD) array 80 included in the mobile phone 20. Images received by the CCD 80 are input to an image processing circuit 82 included in the mobile phone 20. Using conventional techniques, the image processing circuit 82 provides appropriate processing of the images under the control of the camera functions 66 so that photographs taken during camera operation are processed and stored in memory 64, for example.

The camera lens 42 preferably includes two or more lens elements 84. The relative positioning of the lens elements 84 with respect to each other and/or the CCD 80 may be adjusted mechanically via small motors or other electromechanical moving means (e.g., voice coil, piezoelectric element, etc.) (not shown) included in the camera lens 42. In the exemplary embodiment, a motor driver 86 included in the mobile phone 20 controls the positions of the lens elements 84. The motor driver 86 is responsive to control signals from the control circuit 60 and adjusts the positions of the lens elements 84 in accordance with the control signals.

By adjusting the positions of the lens elements 84, the mobile phone 20 is able to control the focal length or focus of the camera lens 42. In an embodiment where the camera lens 42 is also a zoom lens, the mobile phone 20 is also able to control the amount of optical zoom provided during a given photograph. In an embodiment where the camera lens is not a zoom lens, the mobile phone 20 is still able to control the amount of digital zoom by increasing/decreasing the relative size of the image digitally as is conventional.

The particular operating mode of the mobile phone 20 is controlled by user selection via the keypad 30, menu selections via the display 24, etc., as is conventional. Upon being configured for operation of the mobile phone 20 as a phone, the user may press the button 34 in order to pick up an incoming call, for example. The button 34 provides an input control signal to the phone functions 65 which interpret the control signal as a request to pick up the incoming call. The input control signal from the button 34 is also input to the camera functions 66. During operation of the mobile phone 20 as a phone, however, the control circuit 60 is configured such that the camera functions 66 disregard the input from button 34. Conversely, upon the mobile phone 20 being configured for operation as a camera, the control circuit 60 enables the camera functions 66 to receive the input control signal from the button 34 as an autofocus/shutter control button. At the same time, the phone functions 65 disregard the input from the button 34.

Similarly, when the mobile phone 20 is configured as a phone, the phone functions 65 receive the inputs from buttons 32a and 32b and interpret such inputs to control the volume of the speaker 28 for telephone conversations. While the inputs from the buttons 32a and 32b are also received by the camera functions 66, the camera functions 66 disregard such inputs. On the other hand, when the mobile phone 20 is configured to function as a camera, the control circuit 60 is designed such that the camera functions 66 ordinarily interpret the inputs from the buttons 32a and 32b as controls for increasing or decreasing the amount of zoom. The phone functions 65 disregard the inputs from the buttons 32a and 32b during camera operation.

When wishing to take a picture with the mobile phone 20 operating as a camera, a user directs the lens 42 towards the object to be photographed as previously explained. In this particular example, the image received by the CCD sensor 80 is provided to the display 24 via the camera functions 66 so as to function as an electronic viewfinder. As will be appreciated, another embodiment of the invention may utilize a simple optical viewfinder or the like without departing from the scope of the invention.

As the user depresses the button 34 partially to initiate autofocus control, the camera functions 66 detect such input and requests that the autofocus functions 68 perform conventional autofocus control. In order to do so, the autofocus functions 68 cause the autofocus transducer 44 to emit and receive infrared pulses or the like. The autofocus functions 68 process the pulses received by the autofocus transducer 44 in order to determine the time of flight of the pulses reflected by the object and thus determine the distance between the mobile phone 20 and the object. In accordance with an exemplary embodiment of the present invention, provided the time of flight calculated by the autofocus functions 68 is equal to or greater than some predetermined amount indicative of the object being sufficiently far away for proper focus, the autofocus functions 68 communicates to the camera functions 66 the determined focal length between the mobile phone 20 and the object being photographed. The camera functions 66 in turn provides control signals to the motor driver 86 which in turn adjusts the positioning of the lens elements 84 to provide proper focus of the object.

At the same time, if the user wishes to zoom in or out relative to the object, the user may press the buttons 32a and/or 32b to control the zoom. The camera functions 66 receive the control inputs from the buttons 32a and 32b and manipulate the zoom either optically or digitally as described above. Once the user has selected the desired zoom amount and receives an indication from the camera functions 66 that autofocus control has been locked in, the user may depress the button 34 fully to activate the shutter function. At such time, the image on the CCD 80 is captured and stored in memory 64.

On the other hand, if when the user depresses the button 34 partially for autofocus operation the autofocus functions 68 are unable to achieve satisfactory focus (e.g., the calculated time of flight is less than the predetermined amount), the autofocus functions 68 notify the camera functions 66 that satisfactory focus cannot be achieved. The camera functions 66 in turn notify the user (e.g., via a visual or audible indicator) that autofocus has not been achieved. In addition, the camera functions 66 are configured automatically in such instance to interpret inputs from the buttons 32a and 32b as manual focus control signals. Specifically, by pressing the buttons 32a and 32b, the user can adjust the focus of the lens 42 in and out, respectively.

More particularly, the camera functions 66 receive the inputs from the buttons 32a and 32b and in response control the relative positions of the lens elements 84 via the motor driver 86 to allow the user to manually focus the lens 42. By viewing the object via the CCD 80 and electronic viewfinder display 24, for example, the user may adjust the lens 42 via the buttons 32a and 32b until the object becomes optimally focused. The user can then capture the photograph by fully depressing the button 34 to activate the shutter function. The camera functions 66 may then reconfigure the mobile phone 20 for conventional autofocus control unless and until the autofocus functions 68 are again unable to achieve satisfactory focus as described above.

In another embodiment of the invention, the autofocus functions 68 utilize passive autofocus techniques in place of the autofocus transducer 44. For example, the autofocus functions 68 may analyze the image provided by the CCD 80 during autofocus. By analyzing the image in combination with adjusting the lens 42 via the camera functions 66 and motor driver 86, the autofocus functions 68 attempt to maximize edge contrast between objects in the image. The sharper the edge contrast, for example, the better focus. If the autofocus functions 68 are able to achieve a maximum edge contrast equal to or greater than a predetermined amount, the autofocus operation is considered satisfactory. The autofocus functions 68 indicate to the camera functions 66 that autofocus has been satisfactorily achieved. Again, the user is notified and the photograph may be taken by fully pressing the button 34 to activate the shutter operation. The buttons 32a and 32b remain operative to control zoom. Conversely, if the autofocus functions 68 are unable to achieve a maximum edge contrast equal to or greater than the predetermined amount, the autofocus functions 68 notify the camera functions 66 that autofocus has not been achieved. Therefore, again the camera functions 66 notify the user and now automatically interpret the inputs from buttons 32a and 32b as manual focus control instead of zoom control. Thus, the user may manually focus the photograph.

Figure 4:
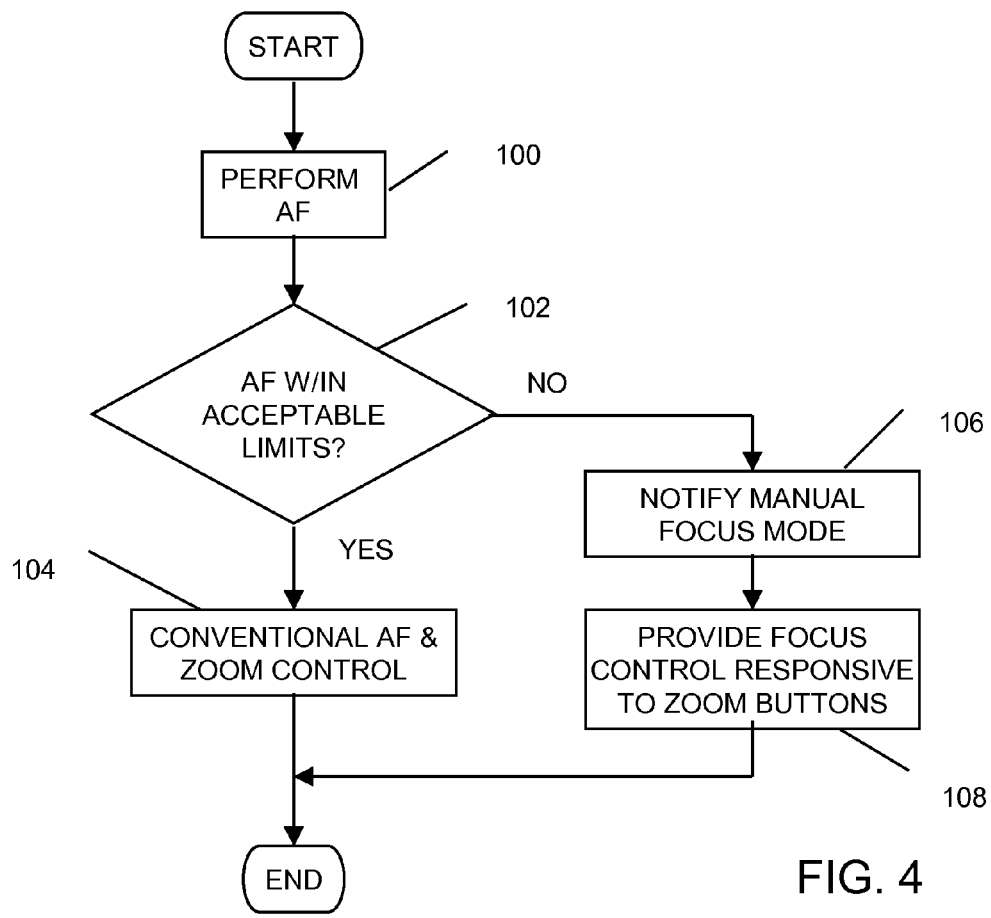
FIG. 4 is a flowchart representing operation of auto/manual focus control in accordance with one embodiment of the present invention.

FIG. 4 is a flowchart describing the operation of the present invention in relevant part. Assuming the mobile phone 20 is in the camera function mode, step 100 represents a user activating the autofocus control such as by pressing the button 34 only partially. Those having ordinary skill in the art will appreciate, however, that the autofocus control may be activated by some other means without departing from the scope of the present invention. Following step 100, the mobile phone 20 proceeds to step 102 in which the autofocus functions 68 determine if autofocus is satisfactorily achieved (e.g., by TOF or edge contrast criteria) as described above. If yes, the mobile phone 20 proceeds to step 104 in which conventional autofocus control is utilized and zoom control via buttons 32a and 32b is available.

If in step 102 the autofocus functions 68 determine that autofocus is not satisfactorily achieved (e.g., by TOF or edge contrast criteria) as described above, the mobile phone 20 proceeds to step 106 rather than step 104. In step 106, the mobile phone 20 notifies the user that satisfactory autofocus has not been achieved and manual focus is available. Then, as represented in step 108, the mobile phone 20 provides manual focus control via the buttons 32a and 32b.

Figure 5:
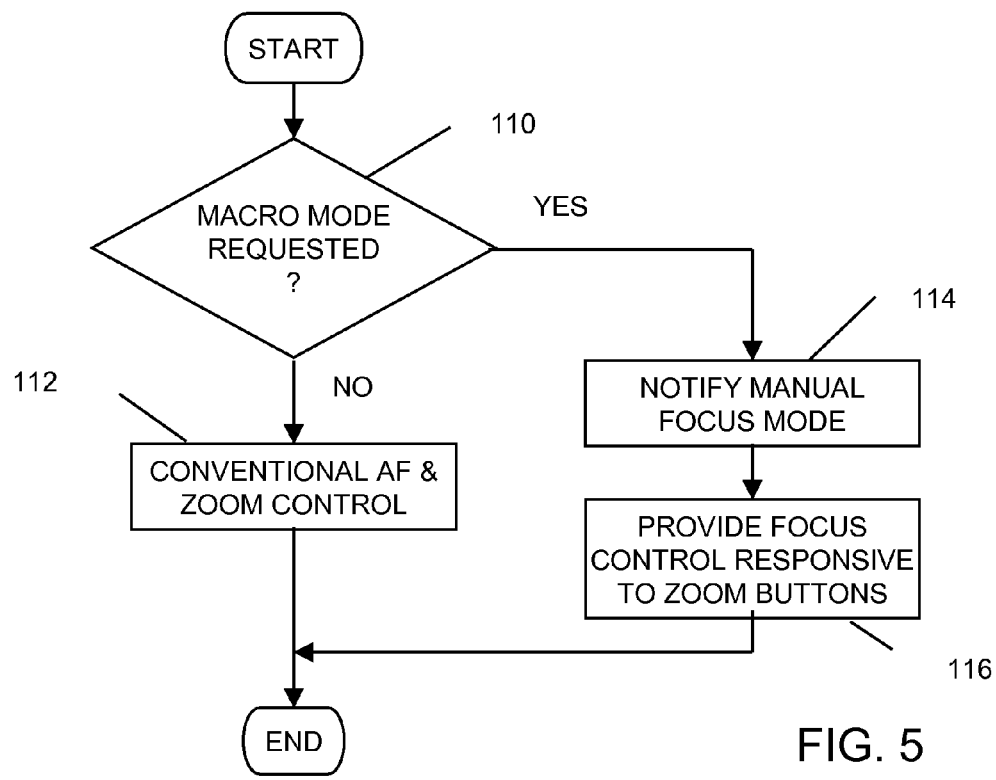
FIG. 5 is a flowchart representing operation of auto/manual focus control in accordance with another embodiment of the present invention.

FIG. 5 illustrates operation of the mobile phone 20 in accordance with another embodiment of the invention. In this particular embodiment, whether conventional autofocus or manual focus via the buttons 32a and 32b is provided is controlled simply by whether the user places the mobile phone 20 in a macro photography mode. If the user selects macro photography operation by way of the keypad 30, menu selections via the display, or the like, the camera functions 66 automatically revert to operation in which the buttons 32a and 32b provide manual focus control.

Thus, step 110 of FIG. 5 represents the camera functions 66 determining whether the user has selected macro photography operation. If no, the mobile phone 20 proceeds to step 112 in which the mobile phone carries out conventional autofocus control and zoom control is available via the buttons 32a and 32b, similar to step 104 in the embodiment of FIG. 4. If yes in step 110, the mobile phone proceeds to step 114 in which the mobile phone 20 notifies the user that autofocus has not been achieved and manual focus is available similar to step 106 in FIG. 4. Then, as represented in step 116, the mobile phone 20 provides manual focus control via the buttons 32a and 32b similar to step 108 in FIG. 4.

Figure 6A:
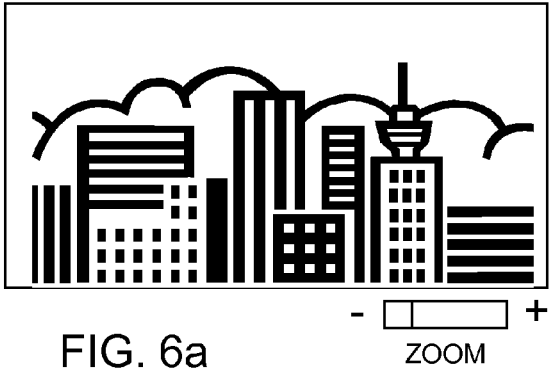
FIGS. 6a and 6b represent typical zoom operation in accordance with the present invention.
Figure 6B:
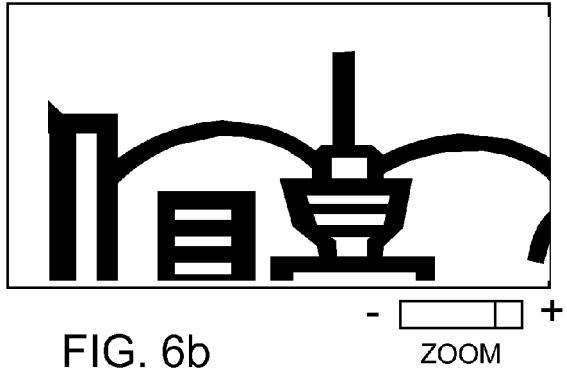

FIGS. 6a-6b, 7a-7b and 8a-8b represent the operation of the mobile phone in accordance with the present invention from the perspective of what may be seen via the display 24 serving as an electronic viewfinder. Referring initially to FIGS. 6a-6b, shown is typical operation of the mobile phone 20. FIG. 6a illustrates a view of a city skyline. An icon on the display indicates the level of zoom employed. FIG. 6b represents the view following the user increasing the amount of zoom via the buttons 32a and 32b.

Figure 7A:
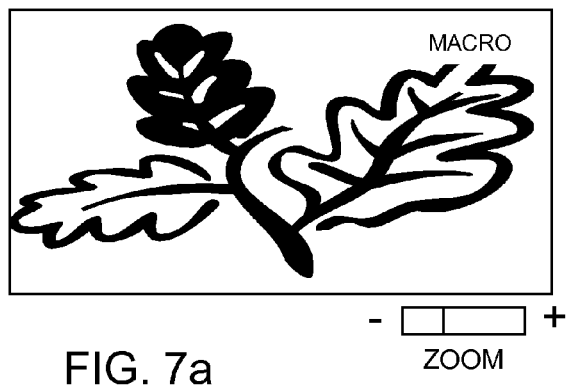
FIGS. 7a and 7b represent typical macro operation and zoom operation in accordance with the present invention.
Figure 7B:
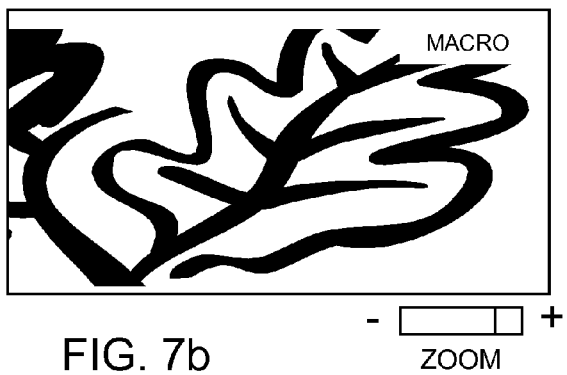

FIG. 7a illustrates a view of a leaf with a given amount of zoom during macro photography. FIG. 7b represents the leaf with an increased amount of zoom via the buttons 32a and 32b.

Figure 8A:
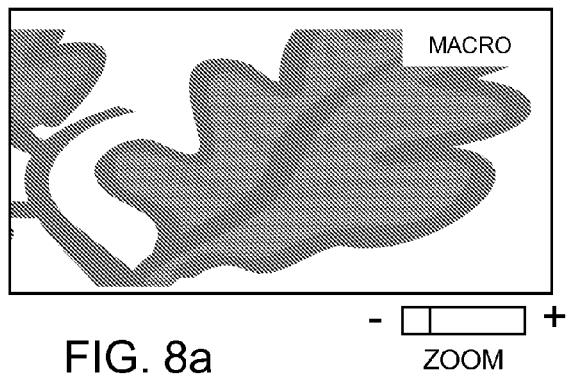
FIGS. 8a and 8b represent macro operation and manual focus based on zoom operation in accordance with the present invention.
Figure 8B:
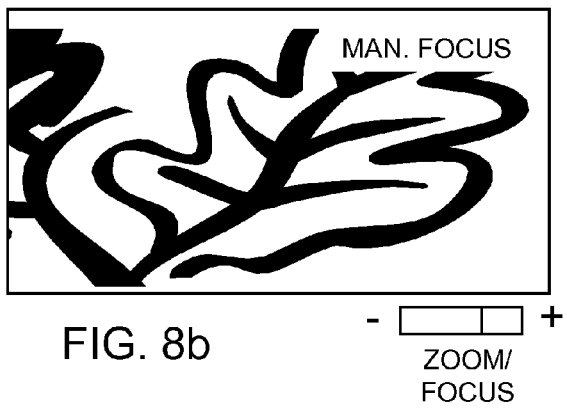

FIG. 8a represents a view of the leaf in the event the autofocus control is unable to satisfactorily focus on the leaf as described above. Alternatively, autofocus control may simply not be available as a result of the mobile phone 20 being in macro operation as in the embodiment of FIG. 5. In either case, the mobile phone 20 reverts to manual focus control as represented in FIG. 8b. Note how the viewfinder includes an icon indicating that the mobile phone 20 is now being manually focused. By adjusting the buttons 32a and 32b as represented by the zoom/focus menu bar, a user may achieve satisfactory focus manually as shown in FIG. 8b.

Figure 9:
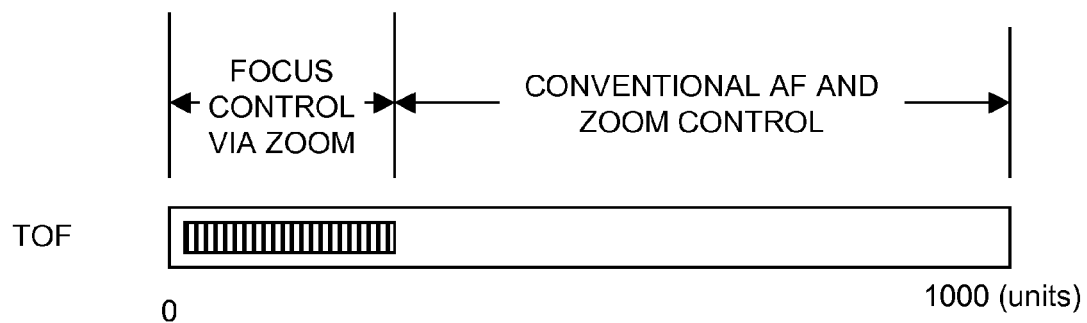
FIG. 9 represents a sample criteria for reverting to manual focus based on zoom operation in accordance with the present invention.
Figure 10:
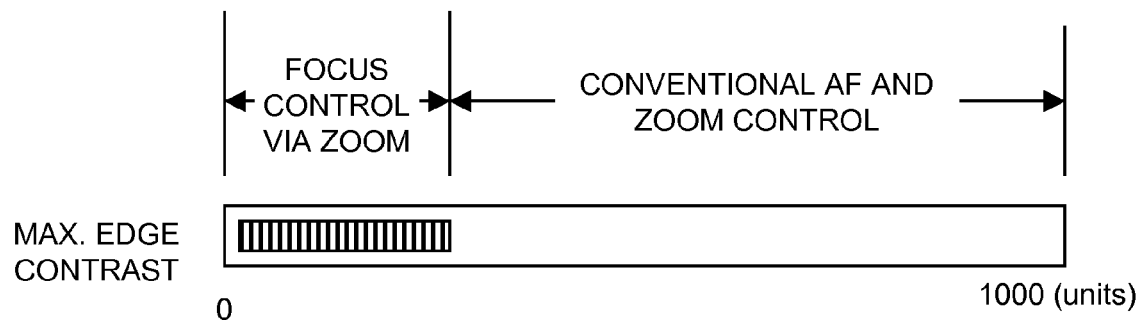
FIG. 10 represents another sample criteria for reverting to manual focus based on zoom operation in accordance with the present invention.

FIGS. 9 and 10 graphically illustrate exemplary criteria for changing between autofocus and manual focus in accordance with the present invention. FIG. 9 represents how manual focus via the buttons 32a and 32b is provided in the event a measured TOF of the autofocus transducer 44 pulses is less than a predefined criteria. Otherwise, conventional zoom operation is provided via the buttons 32a and 32b. FIG. 10 represents the case where control is based on the maximum peak contrast achieved via passive autofocus control as described above.

While the present invention is described above in the context of volume control/zoom control buttons 32a and 32b serving as manual focus control buttons, those having ordinary skill in the art will appreciate that controls associated with other functions may instead serve as the manual focus control buttons in the event satisfactory autofocus is not achieved. The present invention is not intended to be limited in its broadest sense to the specific embodiments described herein.

The term "electronic device" as referred to herein includes portable radio communication equipment. The term "portable radio communication equipment", also referred to herein as a "mobile radio terminal", includes all equipment such as mobile phones, pagers, communicators, e.g., electronic organizers, personal digital assistants (PDAs), smartphones or the like.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

The invention claimed is:

1. An electronic device, comprising:
    circuitry for carrying out an operation unrelated to camera operation;
    camera circuitry for carrying out a camera related operation, the camera circuitry including circuitry for providing autofocus control;
    a camera lens operatively coupled to the camera circuitry, a focus state of the camera lens being controlled by the camera circuitry;
    an operator input operatively coupled to at least the camera circuitry for enabling an operator to provide an input unrelated to focus control of the camera lens in a first operating condition, and to provide a manual focus control input to the camera lens in response to the electronic device entering a second operating condition; and
    the camera circuitry further comprises circuitry for automatically reconfiguring the operator input from the first operating condition to the second operating condition in response to a determination of focusing conditions.

2. The electronic device of claim 1, wherein the operator input in the first operating condition provides zoom control as part of the camera related operations.

3. The electronic device of claim 1, wherein the determination of focusing conditions comprises determining whether the autofocus control is acceptable in accordance with a predefined criteria, and based on the determination the camera circuitry automatically controls whether the operator input is operative in the first operating condition or the second operating condition.

4. The electronic device of claim 3, wherein the circuitry for providing autofocus control provides active autofocus control.

5. The electronic device of claim 4, wherein the circuitry for providing autofocus control utilizes time of flight of transmitted and received pulses, and the predefined criteria is based on time of flight information obtained by the circuitry for providing autofocus control.

6. The electronic device of claim 5, wherein the pulses are infrared light pulses.

7. The electronic device of claim 3, wherein the circuitry for providing autofocus control provides passive autofocus control.

8. The electronic device of claim 7, wherein the predefined criteria is based on an evaluation of edge contrast.

9. The electronic device of claim 1, wherein whether the operator input is operative in the first operating condition or the second operating condition is based on an operator mode selection.

10. The electronic device of claim 9, wherein the operator mode selection is a macro photography mode selection.

11. The electronic device of claim 1, wherein in the first operating condition, the input unrelated to focus control of the camera lens is unrelated to a camera operation and comprises a function of mobile phone operation.

12. The electronic device of claim 11, wherein the operator input is operative in the first operating condition to control the function of mobile phone operation.

13. The electronic device of claim 12, wherein the function comprises volume within the mobile phone operation.

14. The electronic device of claim 1, wherein the circuitry for carrying out an operation unrelated to camera operation and the camera circuitry are embodied at least in part within a common microcontroller.

* * * * *